(12) United States Patent
Fisher

(10) Patent No.: US 11,258,244 B2
(45) Date of Patent: Feb. 22, 2022

(54) BUSBAR SUPPORT SYSTEM HAVING ANTI-ROTATION AND ANTI COMPRESSION FEATURES

(71) Applicant: Schneider Electric USA, Inc., Andover, MA (US)

(72) Inventor: Mark J. Fisher, Murfreesboro, TN (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 17/103,371

(22) Filed: Nov. 24, 2020

(65) Prior Publication Data

US 2021/0159684 A1 May 27, 2021

Related U.S. Application Data

(60) Provisional application No. 62/939,841, filed on Nov. 25, 2019.

(51) Int. Cl.
| | |
|---|---|
| *H02G 5/00* | (2006.01) |
| *H02G 5/02* | (2006.01) |
| *H02G 3/00* | (2006.01) |

(52) U.S. Cl.
CPC ............... *H02G 5/025* (2013.01); *H02G 3/26* (2013.01)

(58) Field of Classification Search
CPC ................................. H02G 5/025; H02G 3/26
See application file for complete search history.

(56) References Cited

U.S. PATENT DOCUMENTS

| | | | |
|---|---|---|---|
| 5,160,284 A | 11/1992 | Krom | |
| 10,312,678 B1* | 6/2019 | Wiant | ................... H01R 25/162 |
| 2001/0028547 A1* | 10/2001 | Wagener | .................. H02B 1/20 |
| | | | 361/611 |
| 2001/0037894 A1* | 11/2001 | Zachrai | .................. H02G 5/025 |
| | | | 174/70 B |

* cited by examiner

*Primary Examiner* — Pete T Lee
(74) *Attorney, Agent, or Firm* — Locke Lord LLP

(57) ABSTRACT

A busbar support system having means for preventing rotation of a threaded shaft which connects busbars to the busbar support and means to prevent compressive forces resulting for the bolted connection from causing damage to the busbar support.

5 Claims, 6 Drawing Sheets

BUSBAR SUPPORT SYSTEM HAVING ANTI-ROTATION AND ANTI COMPRESSION FEATURES

PRIORITY INFORMATION

The present application claims the benefit of and priority to U.S. Provisional Application Ser. No. 62/939,841 filed on Nov. 25, 2019, which is incorporated by reference herein in its entirety.

FIELD OF THE INVENTION

The invention is generally directed to means for supporting electrical busbars in electrical enclosures and particularly to preventing physical damage to the supporting means.

BACKGROUND OF THE INVENTION

The uses of nonconductive support means for uninsulated electrical conductors is well known. These nonconductive supports are generally made from glass filled polyester materials, which is strong but can be damaged if subjected to excessive pressure such as a bolted connection. This is especially true when the support means is of tubular construction and the force of the bolted connection is against opposing walls of the tube.

SUMMARY OF THE INVENTION

The problem cited above is prevented by directing the compressive force of a bolted connection across two opposing walls of the busbar support means to a metal to metal-to-metal intersection between the sleeve and a backing plate at each end of the sleeve. A busbar support system comprising:
a busbar support constructed from an electrical insulating material, the busbar support having a generally square cross-section and defining an aperture through two opposing sides;
a backing spacer having a longitudinal dimension and two flanges extending outwardly along the longitudinal dimension, the flanges being spaced apart for snugly receiving opposing sides of the busbar support, the backing spacer defining a window positioned to coincide with the aperture in the busbar support, the window having at least one short dimension and one long dimension;
a sleeve being generally non-circular in cross-section and defining a generally non-circular passage, the sleeve having, at each end, two tabs extending from opposite sides of the sleeve, the tabs being separated by shoulders, the tabs having a width dimensioned to be snugly but slidably received in the short dimension of the window defined in the backing plate and a length sufficient to extend through the window while the shoulders engage the backing spacer along the edge of the long dimension of the window defined in the backing plate,
a shaft having threads at each end and a middle section being non-circular in cross-section between the threaded ends, the non-circular cross-section being dimensioned to be slidably received in the generally non-circular passage of the sleeve;
at least one busbar being held snugly against the backing plate by washers and nuts installed on each end of the shaft, compression of the busbar support being prevented by the engagement of the sleeve shoulders and the backing plates.

DETAILED DESCRIPTION OF THE EXAMPLE EMBODIMENTS

Figure 1:
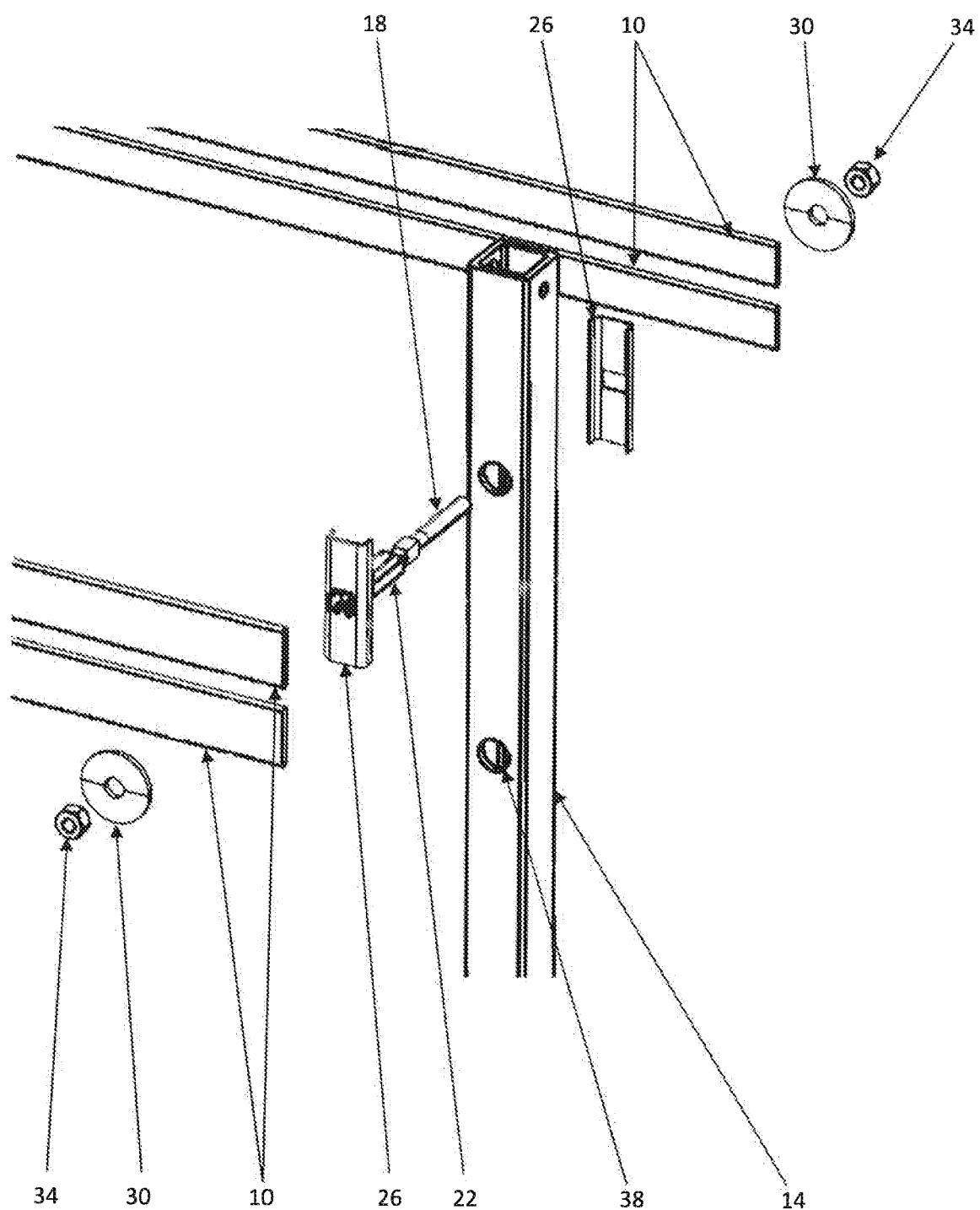
FIG. 1 illustrates the support means of the present invention and associated electrical busbars.

Referring to FIG. 1, uninsulated busbars 10 are placed along one side of a busbar support 14 or along two opposed sides of the busbar support 14. The busbars 10 are attached to the busbar support 14 by hardware comprising a threaded shaft 18, a sleeve 22, backing spacers 26, washers 30 and nuts 34. The sleeve 22 is received in apertures 38 in opposing sides of the busbar support 14.

Figure 2:
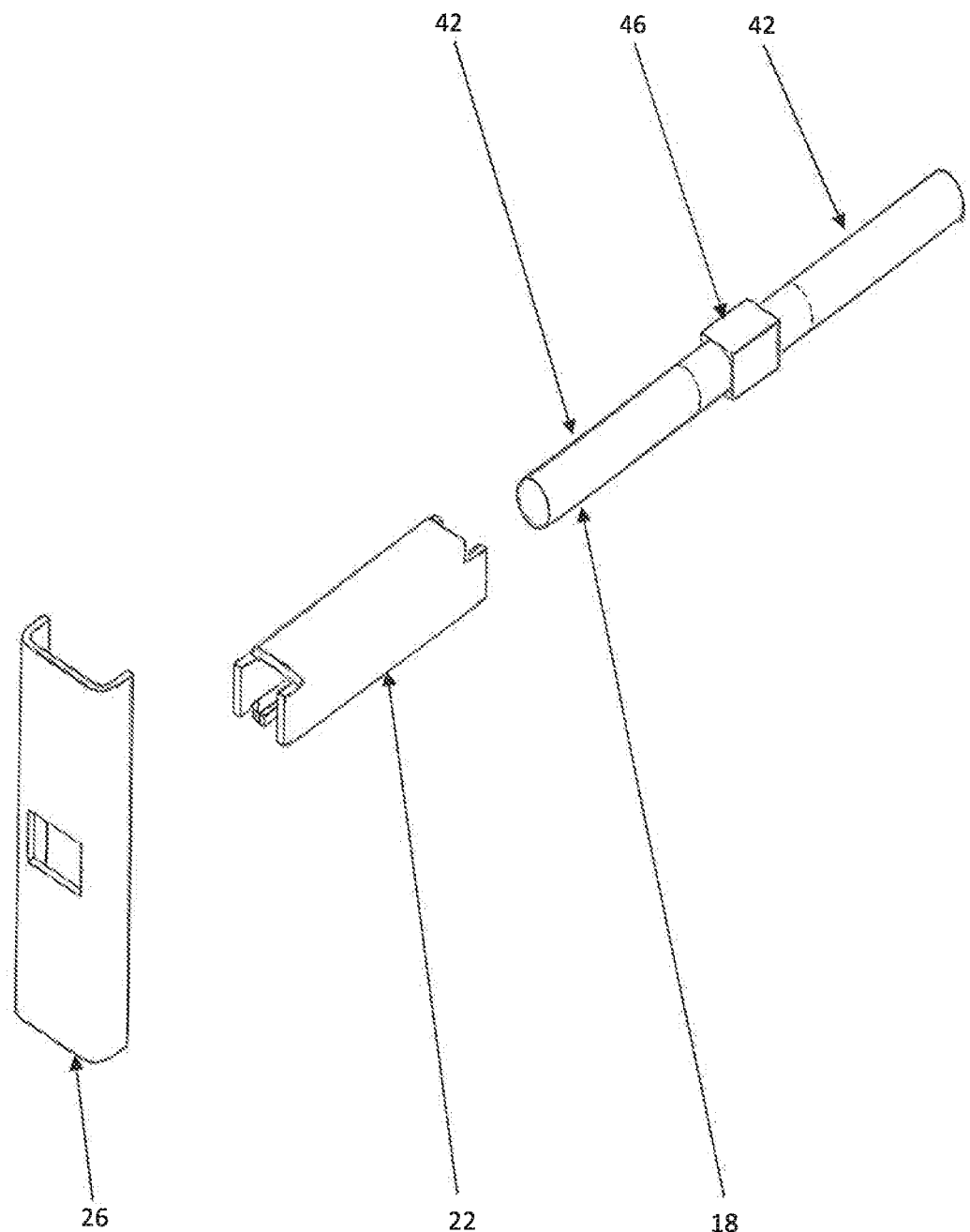
FIG. 2 illustrates in more detail the backing plate, sleeve and threaded shaft.

Referring to FIG. 2, the sleeve 22 is tubular and has an internal cross-sectional shape that can be square, rectangular or some shape other than circular. The sleeve 22 can also be "C" shaped in cross-section. The threaded shaft 18 has threads 42 on each end and a middle section 46 which has a cross-section that coincides with the internal cross-section of the sleeve 22. The coinciding cross-sections allow the threaded shaft 18 to slide longitudinally within the sleeve 22 but prohibits rotation of the threaded shaft 18 within the sleeve 22.

Figure 3:
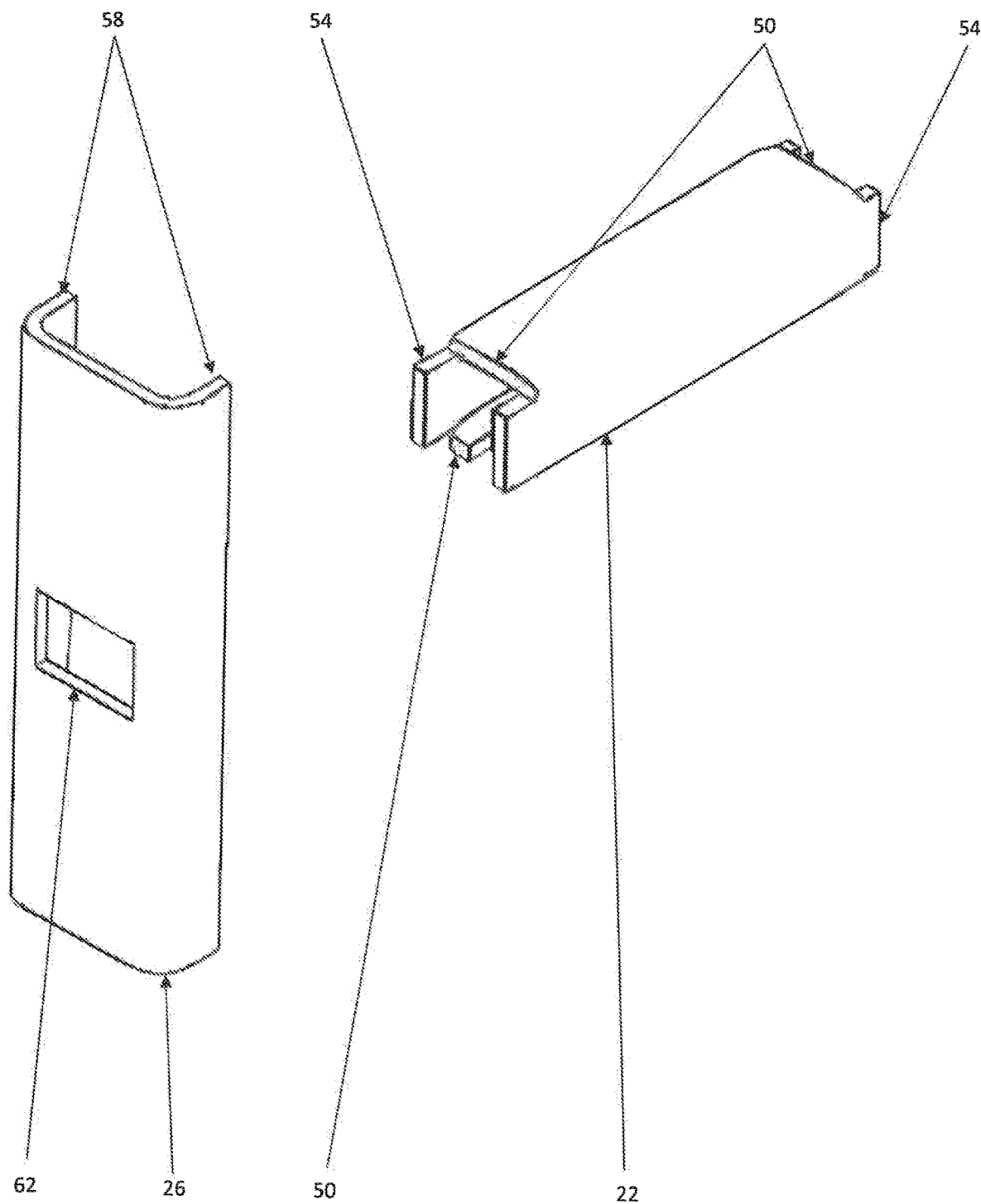
FIG. 3 illustrates in more detail the elements of the backing plate and sleeve.

Referring to FIG. 3, the sleeve 22 and backing spacer 26 are described in more detail. The sleeve 22 has shoulders 50 at each end. The shoulders 50 are formed from opposing sides of the sleeve 22. The sleeve 22 also has tabs 54, which extend outward from the opposing sides of the sleeve 22 between the shoulders 50. The backing spacer 26 has two longitudinal sides from which flanges 58 extend outwardly. The flanges 58 are spaced apart such that they fit snugly along opposing sides of the busbar support 14. The backing spacer 26 also has a window 62 that receives the tabs 54 of the sleeve 22.

Figure 4:
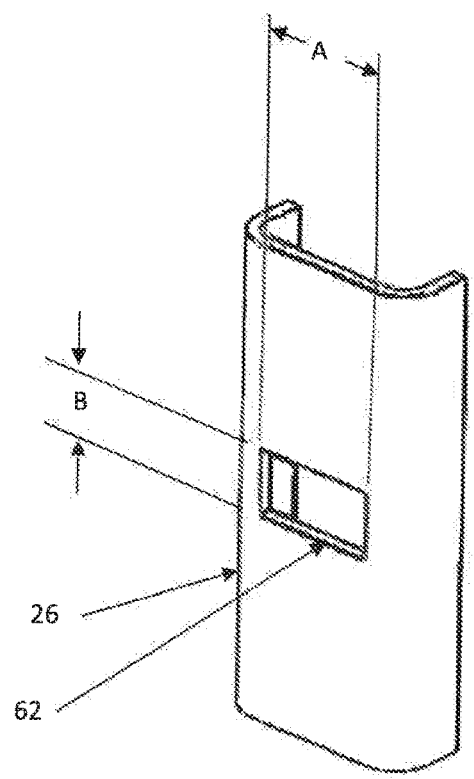
FIG. 4 illustrates the dimensional relationship of the backing plate.
Figure 6:
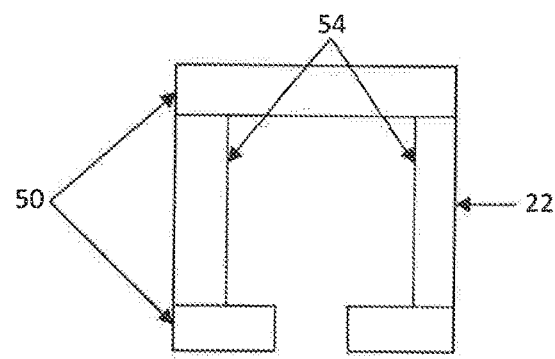
FIG. 6 is an end view of the sleeve.
Figure 5:
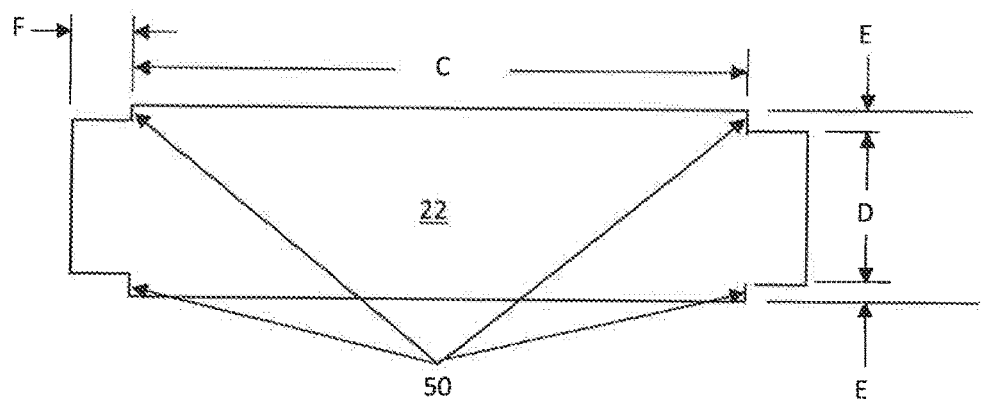
FIG. 5 illustrates dimensional relationship of the sleeve.

Referring to FIGS. 4 and 6, the engagement between the sleeve 22 and backing spacers 26 is described in more detail. In FIG. 4, dimension A is the width of the window 62 in backing spacer 26 and dimension B is the height of the window 62 in backing spacer 26. In FIG. 5, dimension C is approximately equal to the distance between the outside surfaces of the two opposing sides of busbar support 14 having apertures 38 through which the sleeve 22 passes. Dimension D is the height of the tabs 54, which is sufficient to permit tabs 54 to slidingly pass through the height B of window 62 in backing spacer 26. Dimension E is the distance from the top/bottom of the tab 54 to the top/bottom of the sleeve 22, which forms the shoulders 50. Dimension E is approximately equal to the metal thickness of the sleeve 22. Dimension F is the length of tab 54, which extends past the backing spacer 26 when the busbars 10 are securely attached to the busbar support 14. Dimension F is sufficiently long enough to pass through the backing spacer 26 and firmly engage the busbars 10 but not extend past the busbars 10 where they could interfere with washers 30 and prevent the busbars 10 from being properly secured to the busbar support 14. Dimension F is approximately equal to the thickness of the backing spacer 26 and ¾ of the thickness of busbar 10.

FIG. 6 is an end view of the sleeve 22 showing the shoulders 50 and tabs 54. FIG. 6 illustrates a generally "C" shaped sleeve 22.

Figure 7:
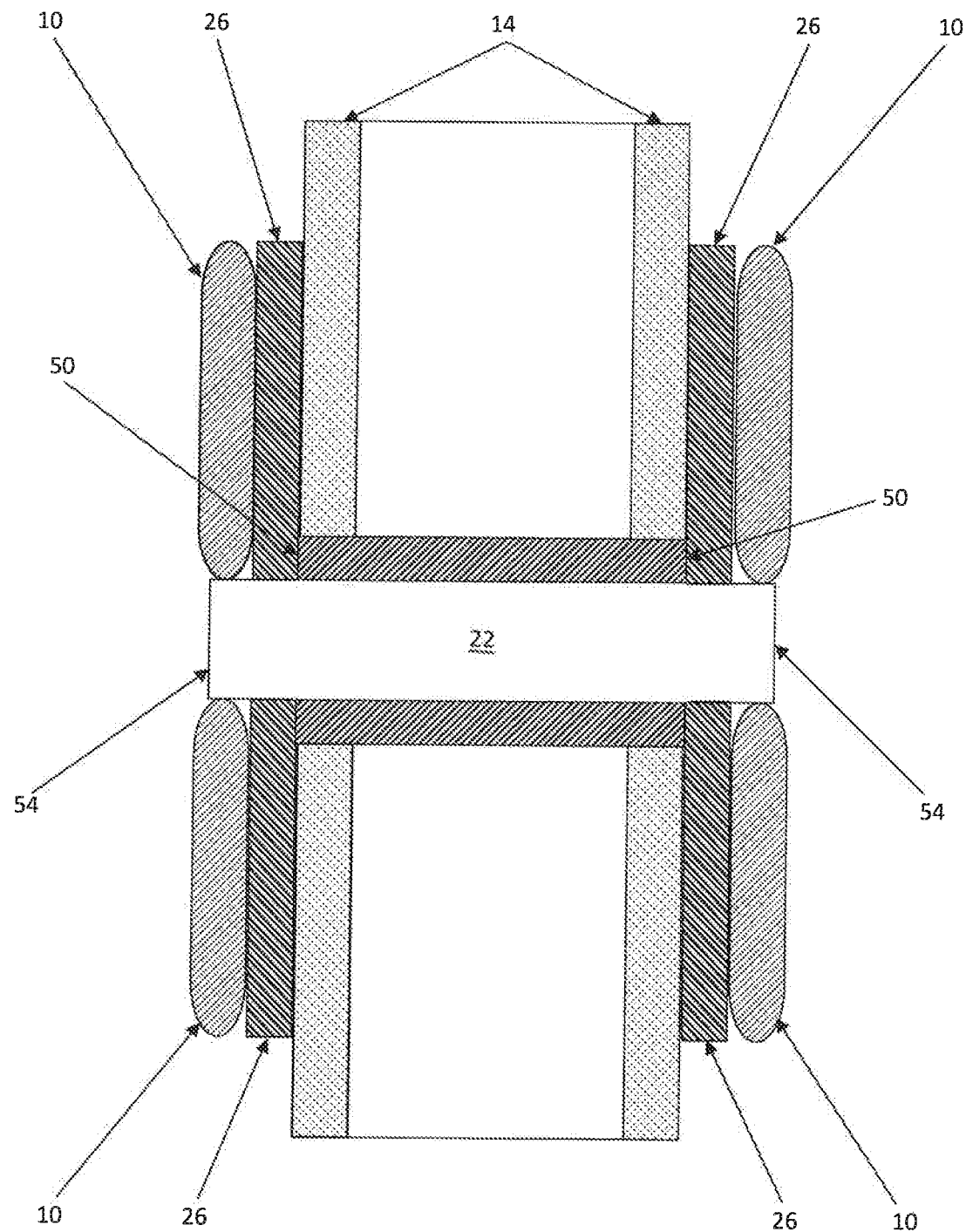
FIG. 7 illustrates in cross-section the relationship of the electrical busbars, backing plates, sleeve and support means.

FIG. 7 illustrates in cross-section the proper arrangement of busbars 10, busbar support 14, backing spacers 26 and sleeves 22 (without threaded shaft 18, washers 30 and nuts 34). In particular, FIG. 7 clearly illustrates the interaction between the multiple busbars 10 and tabs 54 which prevents rotation of the sleeve 22 and threaded shaft 18 while tightening the nuts 34 on threaded shaft 18. FIG. 7 also clearly illustrates the interaction between the backing spacers 26 and the shoulders 50 of sleeve 22. Since the shoulders 50 abut the backing spacers 26 the force resulting from tightening the nuts 34 on threaded shaft 18 is not exerted against the opposing walls of the busbar support 14 but is directed to the sleeve 22. Therefore, sleeve 22 performs two functions, preventing rotation of the threaded shaft 18 and preventing a compressive force on the busbar support 14.

Figure 8:
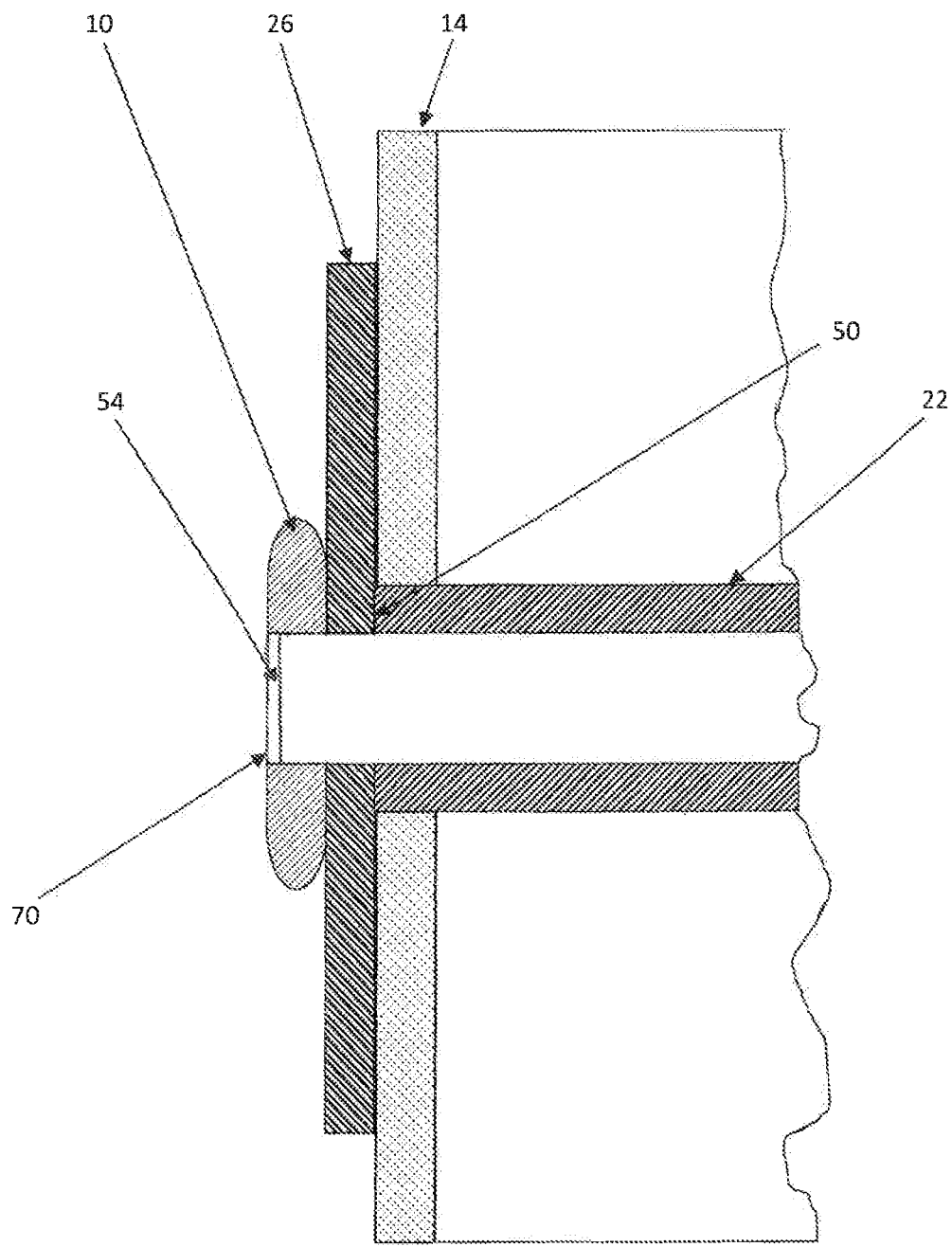
FIG. 8 illustrates in cross-section the relationship of a single electrical busbar, backing plates, sleeve and support means.

Referring now to FIG. 8, an embodiment wherein a single busbar 10 can be attached to the busbar support 14 is illustrated. In this embodiment the busbar 10 has an aperture 66 having the same dimensions as the window 62 in the backing spacer 26. This permits the tabs 54 to be slidably received in the busbar 10 aperture 66 and the shoulder 50 of sleeve 22 to interact with the backing spacer 26. Thus both the anti-turning and anti-compression features are accomplished.

Although specific example embodiments of the invention have been disclosed, persons of skill in the art will appreciate that changes may be made to the details described for the specific example embodiments, without departing from the spirit and the scope of the invention.

What is claimed is:

1. A busbar support system comprising:
a busbar support constructed from an electrical insulating material, the busbar support having a generally square cross-section and defining an aperture through two opposing sides;
a backing spacer having a longitudinal dimension and two flanges extending outwardly along the longitudinal dimension, the flanges being spaced apart for snugly receiving opposing sides of the busbar support, the backing spacer defining a window positioned to coincide with the aperture in the busbar support, the window having at least one short dimension and one long dimension;
a sleeve being generally non-circular in cross-section and defining a generally non-circular passage, the sleeve having, at each end, two tabs extending from opposite sides of the sleeve, the tabs being separated by shoulders, the tabs having a width dimensioned to be snugly but slidably received in the short dimension of the window defined in the backing plate and a length sufficient to extend through the window while the shoulders engage the backing spacer along the edge of the long dimension of the window defined in the backing plate,
a shaft having threads at each end and a middle section being non-circular in cross-section between the threaded ends, the non-circular cross-section being dimensioned to be slidably received in the generally non-circular passage of the sleeve;
at least one busbar being held snugly against the backing plate by washers and nuts installed on each end of the shaft, compression of the busbar support being prevented by the engagement of the sleeve shoulders and the backing plates.

2. The busbar support system of claim 1, wherein the window defined in the backing spacer is generally rectangular in shape.

3. The busbar support system of claim 1, wherein the generally non-circular middle section of the shaft includes at least two opposed sections being equal to the maximum thread diameter of the shaft.

4. The busbar support system of claim 1, wherein the tabs of the sleeve are of a sufficient length to engage the busbars but not engage a washer placed on the shaft.

5. The busbar support system of claim 1, wherein a single busbar can be supported by providing a hole in the busbar having the same dimensions as the window defined in the backing spacer for receiving the tabs of the sleeve.

* * * * *